(12) United States Patent
Snyder

(10) Patent No.: US 7,730,573 B1
(45) Date of Patent: Jun. 8, 2010

(54) CONVERTIBLE FUEL SQUEEGEE

(76) Inventor: Larry Snyder, 3207 Ashworth Rd., Waukee, IA (US) 50263

( * ) Notice: Subject to any disclaimer, the term of this patent is extended or adjusted under 35 U.S.C. 154(b) by 1060 days.

(21) Appl. No.: 11/430,813

(22) Filed: May 9, 2006

(51) Int. Cl.
*F01M 11/12* (2006.01)
(52) U.S. Cl. .................. 15/220.4; 15/104.04; 15/210.1; 33/725
(58) Field of Classification Search ............... 15/220.4, 15/104.04, 210.1; 33/725, 722
See application file for complete search history.

(56) References Cited

U.S. PATENT DOCUMENTS

| 4,017,935 | A | * | 4/1977 | Hernandez | .................. 15/220.4 |
|---|---|---|---|---|---|
| 4,233,704 | A | | 11/1980 | Sartorio | |
| 4,282,624 | A | | 8/1981 | Cobb | |
| 4,716,615 | A | | 1/1988 | Whitehead et al. | |
| 4,891,859 | A | | 1/1990 | Tremblay | |
| 5,598,602 | A | * | 2/1997 | Gibson | ...................... 15/220.4 |
| 6,584,639 | B1 | * | 7/2003 | Snyder | ...................... 15/220.4 |

* cited by examiner

*Primary Examiner*—Shay L Karls
(74) *Attorney, Agent, or Firm*—Camille L. Urban; G. Brian Pingel

(57) ABSTRACT

The dipstick fuel squeegee of the present invention includes an elongated, rigid but lightweight base with foot pegs on either end and is long enough to span the opening of most large tanks. The base has a midsection into which first a wiper member and then a securing member are releasably attached. There are openings in the midsection, the wiper member, and the securing member which are vertically aligned. The openings of the midsection and the securing member are approximately equal in size while the opening in the wiper element is smaller. The wiper element is made of a flexible, resilient material and substantially centered over the opening in the seat. During use, a dipstick is inserted through the three openings of the squeegee, the user secures the squeegee by standing on the foot pegs, and the wiper member dislodges any liquid adhering to the dipstick as the user raises it through the squeegee.

12 Claims, 5 Drawing Sheets

CONVERTIBLE FUEL SQUEEGEE

BACKGROUND OF THE INVENTION

1. Field of the Invention

The present invention relates generally to a device used for measuring fluid level in a large container or tank and, more particularly, to devices used to remove any fluid remaining on the measuring device.

2. Description of the Prior Art

The storage of oil, gasoline or other liquids in large tanks is commonplace. Many of these tanks are buried underground and many do not have fluid level gauges. Therefore, to determine the amount of fluid left in a tank one end of a "dipstick" is inserted into the top of the tank until it reaches the bottom of the tank at which point the stick is withdrawn. At least some of the fluid in the tank adheres to the stick. The level of fluid in the tank is determined according to the height on the stick to which the liquid adhered. Then the fluid must somehow be removed from the stick in order to avoid staining the stick, creating a mess, and, more importantly, to substantially eliminate both fire and environmental hazards which might otherwise result.

In the past, rags have been used to clean these dipsticks and are still used by many today. However, the oil or gas soaked rags pose environmental and fire hazards and their disposal can be problematic. In addition, the purchase of these rags when used in conjunction with frequently measured and large tanks can be expensive.

Devices have been designed to assist in the cleaning of dipsticks although most are specifically intended to be used to check oil levels in combustion engines rather than liquid levels in large tanks. To that end, there are hand-held devices which operate similarly to tongs such that a cleaning pad is mounted on each jaw of the tongs. To clean the dipstick the tongs are opened and the dipstick positioned between the jaws; then the tongs are closed and the stick drawn upwardly. Liquid is removed from the dipstick by the cleaning pads. (See U.S. Pat. No. 4,233,704). Others simply provide a slit in a flexible cleansing material into which the dipstick is slid and then drawn upward.

A number of dipstick squeegees (more particularly designed for engine oil checking) are constructed such that they are attached to the dipstick tube or otherwise mounted on the engine. For example, see U.S. Pat. No. 5,598,602 which employs a squeegee device mounted on the engine which includes a swing arm. The arm is swung into position so that the dipstick can be placed between two sides upon each of which is mounted a disposable cleaning pad. The sides are then squeezed together while the stick is drawn upwards and the liquid removed. The same general idea without the swing arm is disclosed by U.S. Pat. No. 4,716,615 where the device is mounted onto a dipstick receiving tube.

Another example is disclosed by U.S. Pat. No. 4,891,859. Here again the device is mounted on the engine compartment and includes a semi-circular vertical channel with two pairs of vertically spaced resilient flaps inside. The dipstick is moved into the open side of the semicircular channel and between the flaps and drawn upward to remove liquid.

None of these inventions is easily or effectively adaptable to use for measuring liquid levels in large tanks which store, for example, gas or oil. These tanks are often filled though the same opening as their levels are checked which means that the dipstick is not resident there when not in use. Therefore, those prior inventions which combine the stick with a device intended to remain mounted on the tank could create an obstacle to efficiently filling the tank.

There are a few ideas adapted to use for the large-scale tanks. For example U.S. Pat. No. 4,282,624 discloses a device which is attached to the collar or opening of the tank and includes a rubber plat with a slit which is protected on at least three sides by a metal plate. This device is resident with the tank. The slit design is relatively short lived as many of these dipsticks are of cross-section dimensions which do not fit particularly well into the slit. If the slit is widened, parts of the stick will not be contacted leaving fluid on the stick. None accommodated the varying shape of a strapper which is a retractable tape having plum bob at one end.

These large tanks are often filled and levels consequently checked by drivers of tanker trucks. The oil or gas or other liquid remaining on a dipstick or on a tape when checking tanks of this size is, of course, much greater in volume than that on a car engine's dipstick. Therefore the number of rags and the environmental hazards they pose are increased exponentially. It is not reasonable, then, to use any prior inventions wherein absorbent pads are employed. Additionally, the drivers of tanker trucks may deliver at a number of different places so they need a squeegee that is light, transportable, and durable with a wiping surface that is also relatively durable but also easily replaceable when worn. They cannot depend on the places to which they deliver to maintain or even have an efficient squeegee device. The squeegee must be chemically resistant to erosion and sturdy enough to withstand use with dipsticks or tapes with a plum bob up to ten feet long and 1 to 3 square inches in cross section or diameter. Because of the sheer size of these dipsticks and tapes, a handheld squeegee is not practical; one must be able to maneuver the stick or the tape which typically requires both hands.

What is needed is a light and easily transportable, but durable squeegee device which deposits fluid adhering to the dipstick or the tape and plum bob back into the tank. It is desirable to avoid absorbent pads and their consequential environmental and fire hazards and design instead a squeegee that includes a durable surface to remove the liquid which surface can be simply and easily replaced as needed. Although the device needs to be easily transportable and storable, it must also be of a size and construction to survive the rigors of being used with large dipsticks or long tapes. The device must be able to accommodate the varied shapes of a tape and plum bob and able to clean the surface of each. If preferred, the device must be adaptable to be detachably affixed to the collar of tank while leaving a space between the wiper member and the collar through which a measurement of liquid level can be observed. Finally, while light and transportable, the squeegee needs to be constructed for hands-free use and resistant to chemical erosion by gasoline and oil products.

SUMMARY

The present invention addresses the aforementioned needs by using a simple design which includes an elongated, rigid but lightweight base with a midsection and a first section on one side of the midsection and a second section on the opposing side of the midsection with foot pegs at the ends of the first and second sections. The length of base must be sufficient to span the fill opening of most large tanks. The midsection is constructed to comprise a seat or collar with an opening in it. A wiper element is fitted into the seat in the midsection and it also has an opening and, preferably at least one side slit. The opening in the wiper element is smaller and substantially centered over the opening in the seat yet large enough to allow a plum bob or dipstick to slide through and be cleaned. The side slit is of appropriate dimension to allow a tape to be inserted and slid through to clean the tape. If a dipstick is employed, there may be no side slit but, rather, the opening is sized so as to wipe the dipstick clean when it is drawn through.

The wiper member is made of flexible material and is held in place by a securing member. This securing member is of similar size and shape to the wiper element, but constructed of rigid material and with an opening equal in size and position to the opening in the midsection. The wiper element and securing element are releasably secured to the seat in the midsection of the base so that the wiper element can be easily replaced when it becomes worn.

When the squeegee is to be spaced from the collar of the tank, it is equipped with at least one spacer bracket to which the base of the squeegee can be removably attached. Means to detachably affix the spacer bracket to the tank collar are also provided.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
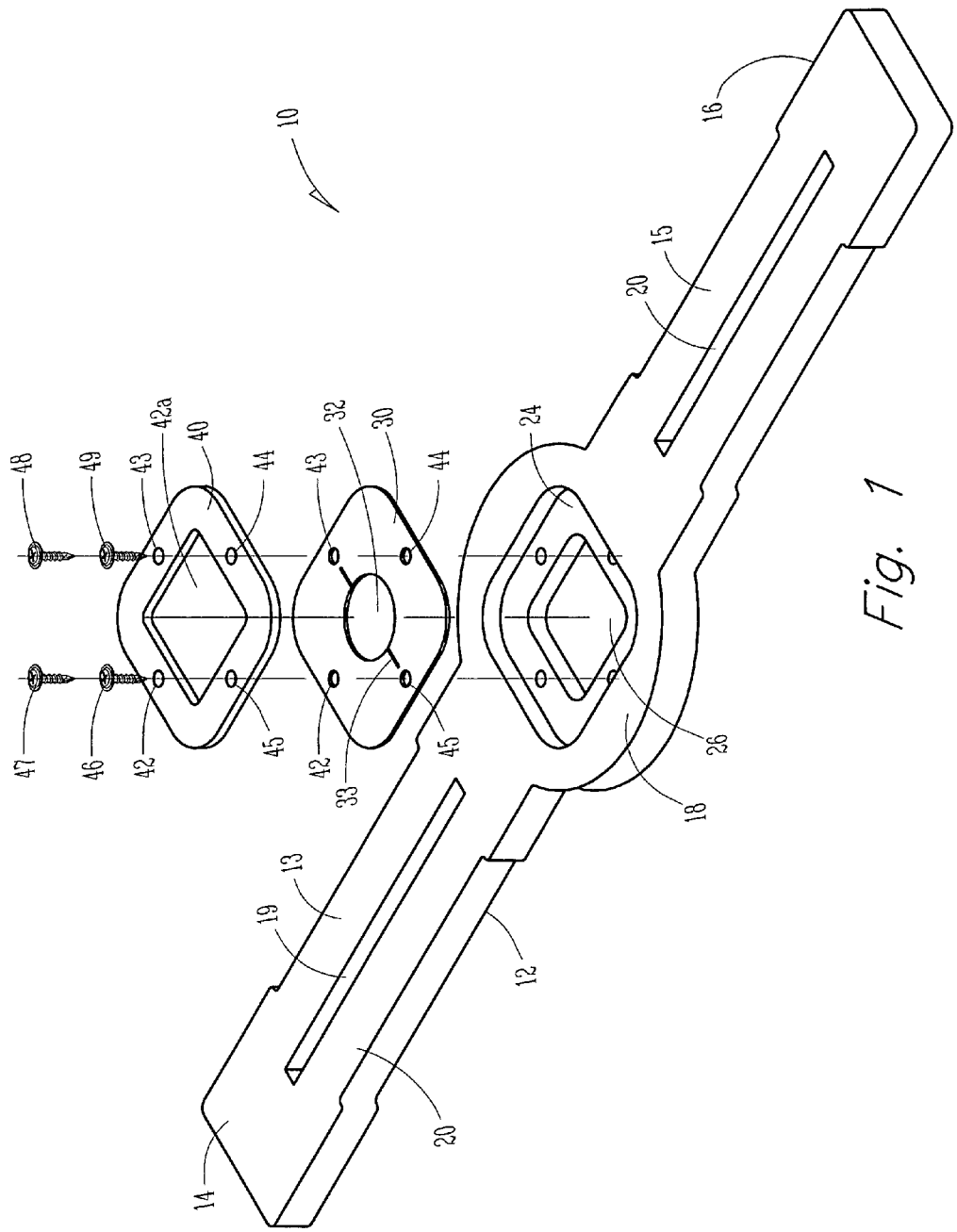
FIG. 1 is a perspective, exploded view of a preferred embodiment of the present invention showing a base, a wiping member, and a securing element.
Figure 5:
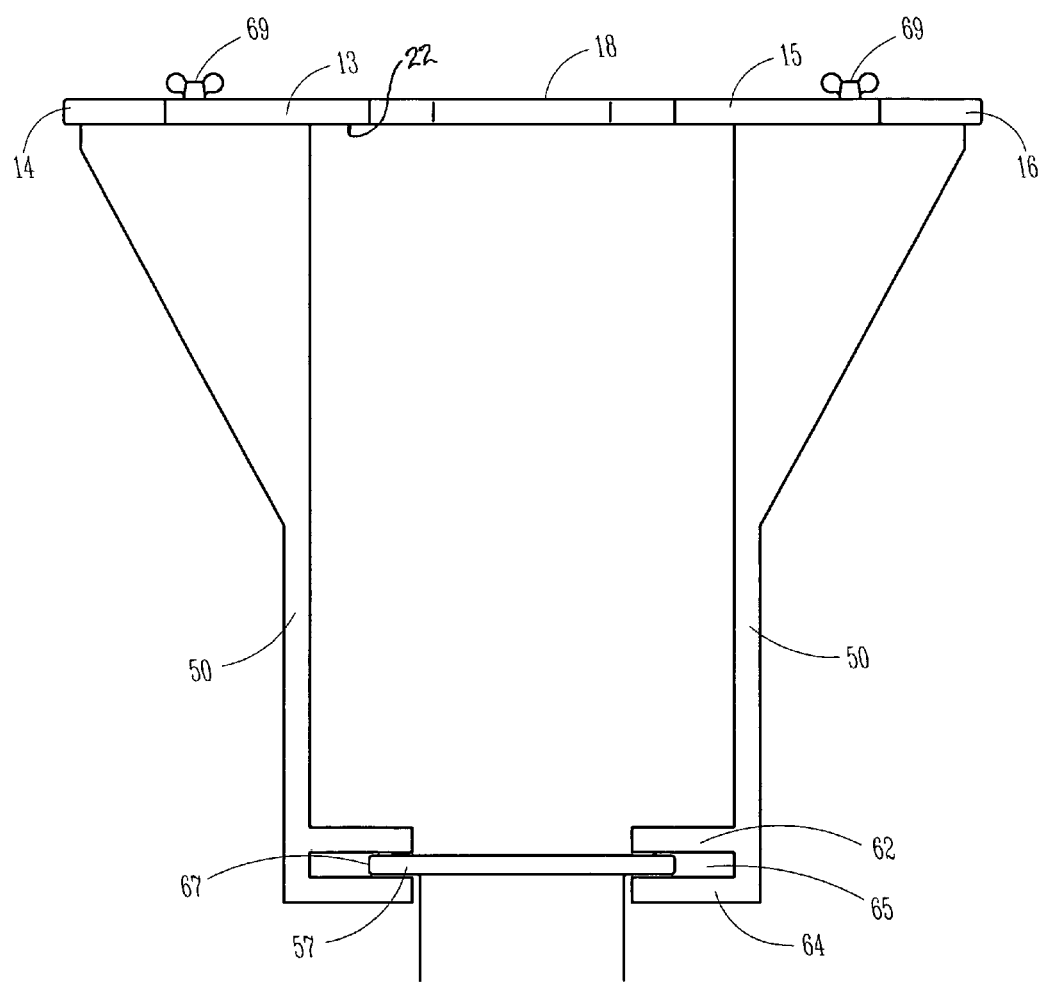
FIG. 5 is a side plan view of the assemble components of FIG. 4.

Shown generally in FIG. 1 as 10 is the convertible dipstick squeegee which comprises a preferred embodiment of the present invention. It includes an elongated base 12 comprising a top surface 20 and a bottom surface 22 (shown only in FIG. 5), a first section 13, a first foot peg 14, a second section 15 and a second foot peg 16 and a midsection 18. In a preferred embodiment said first section 13 and said second section 15 each comprises a slot 19 and 20 respectively for a purpose to be described below. A seat 24 is formed in the top surface 20 of the midsection 18 and includes a first opening 26.

Figure 2:
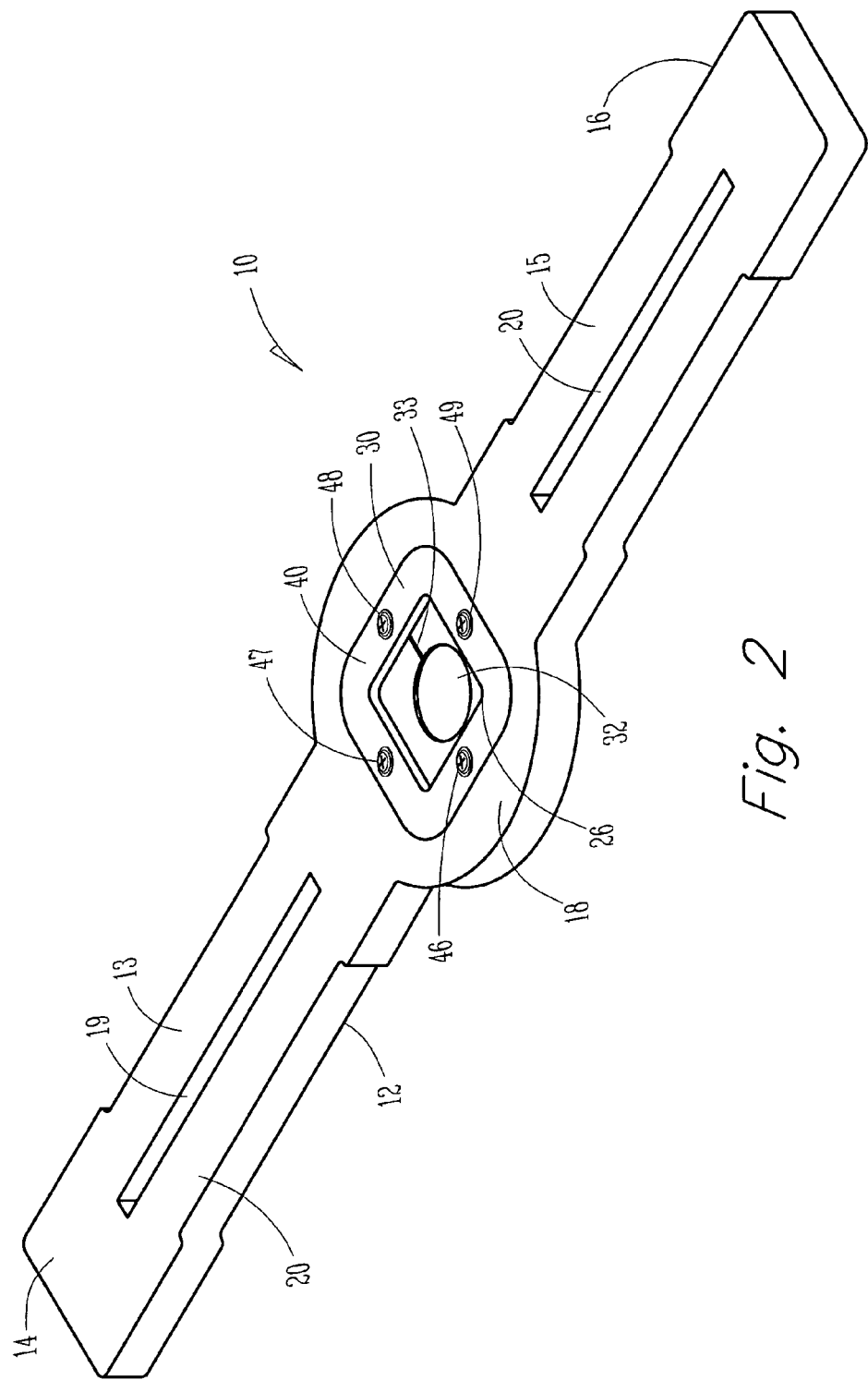
FIG. 2 is a perspective, unexploded view of the base of FIG. 1.

A wiping member 30 shown in FIG. 1 is of equal or nearly equal size and shape as said seat 24 and has a second opening 32 and at least one cleaning slit 33. However, this opening 32 is smaller than said first opening 26 in said midsection 18. The two openings 26 and 32 are vertically aligned with one another when assembled as shown in FIG. 2.

A securing member 40 shown in FIG. 1 is of equal or nearly equal size and shape as the seat 24 and has a third opening 42a which is of approximately the same size and shape as said first opening 26 in said midsection 18. When the squeegee 10 is assembled as shown in FIG. 2, the three openings 26, 32, and 42a are generally vertically aligned and generally coaxial with one another.

Referring back to FIG. 1, means to secure said wiper element 30 and said securing member 40 to said seat 24 are provided. In the preferred embodiment said means comprise apertures 42-45 in said wiper element 30, said securing member 40, and said seat 24 and screws 46-49. The apertures 42-45 in the seat 24, the wiper element 30 and the securing member 40 are vertically aligned with one another and then screws 46-49 are threaded through said apertures until secured.

In the preferred embodiment, the base and the securing member are constructed of very light, durable and generally rigid material such as ABS plastic or a substance more resistant to reaction with oil or gasoline products such as a polypropylene. The wiper element is of a more flexible yet still durable material.

Figure 3:
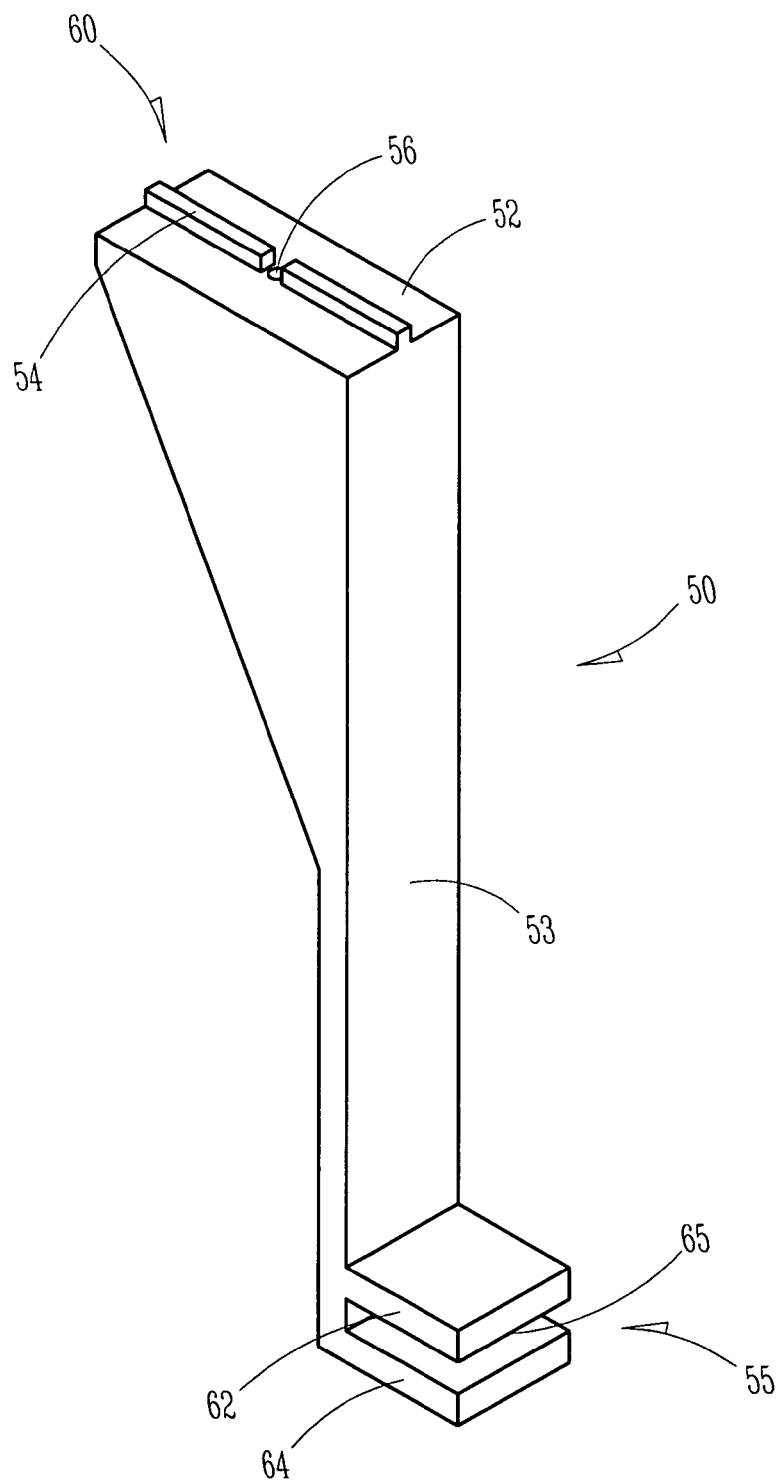
FIG. 3 is a perspective view of a spacer bracket of the present invention.
Figure 4:
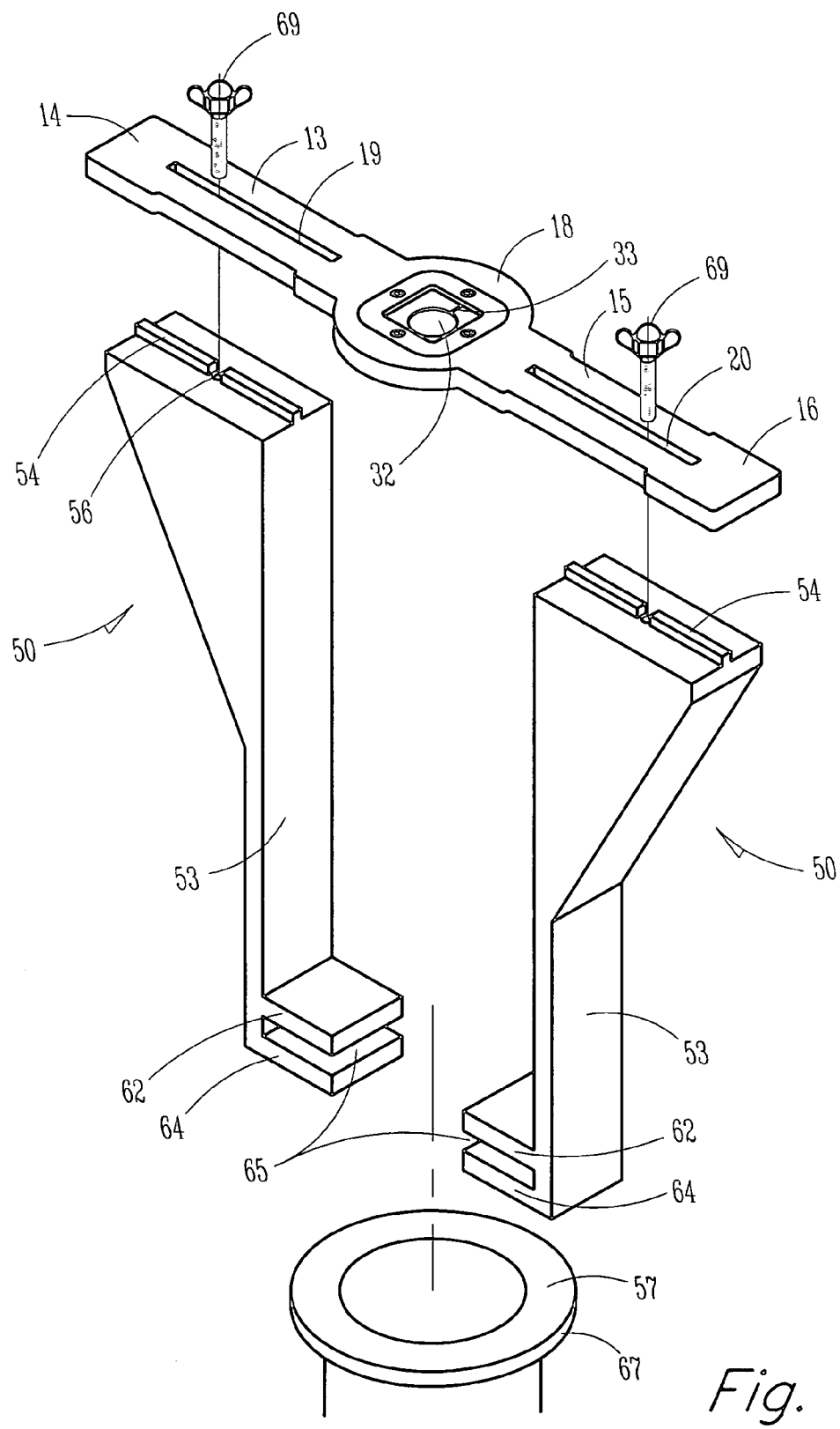
FIG. 4 is an exploded view of the present invention comprising the base, spacer bracket and a tank collar.

When it is preferred that the squeegee and the tank collar be separated by a distance to allow the liquid level on a measuring tape to be observed, at least one spacer bracket 50 (shown in FIG. 3) is employed. Said spacer 50 comprises a top surface 52, a support 53, means to removably attach 60 said base 12 to said at least one spacer 50 and means to detachably affix 55 said support 53 to a tank collar 57. In the preferred embodiment and referring to FIG. 4, said means to detachably affix 55 said support 53 to the tank collar 57 comprises an upper flange 62 and a lower flange 64 separated by a space 65 only slightly larger than a lip 67 of the collar 57. Each said flange 62, 64 respectively, protrudes from said support 53. In the preferred embodiment, means to removably attach said base 60 to said at least one spacer 50 comprises at least one ridge 54 and an opening 56 on said top surface 52, and a thumbscrew 69 which is aligned through said first slot 19 on said base 12 and turned into said opening 56 until secure. A second spacer bracket 50 can be employed if desired for security and strength.

When the convertible fuel squeegee of the present invention is used with a dipstick, the dipstick is lowered through an opening into a tank and raised to check the fluid level. At this point, the top end of the dipstick is inserted through the openings 26, 32, and 42a. After the level is read and recorded, the squeegee 10 is moved down the dipstick to span the opening in the tank, the user places at least one foot on a foot peg 14 or 16, and the dipstick is raised up and through the openings 26, 32, and 42a. The wiping member 30 removes liquid from the dipstick as the stick is raised.

When the convertible fuel squeegee 10 of the present invention is used with a strapper which includes a measure tape with a plum bob at its terminal end, and the squeegee has been installed on a tank collar 57 by use of the spacer bracket 50, the wiper member 40 includes both the opening 32 and the slit 33. The plum bob is inserted through the opening and is followed by the tape to the bottom of the tank. As the tape is raised the user looks through the space between the base 12 and the collar 57 and records the liquid level measurement. Then, the tape is moved into the cleaning slot 33 and raised until the plum bob reaches the wiper member 30. Then, the tape is moved out of the cleaning slot 33 to allow the plum bob to move through the opening 32 and be cleaned accordingly.

After a number of uses, it may become necessary to replace the wiping member 30. This is easily accomplished by removing screws 46-49, lifting off the securing member 40 and the wiper member 30 and replacing said wiper member 30 with another and reversing the process.

Thus, the present invention has been described in an illustrative manner. It is to be understood that the terminology that has been used is intended to be in the nature of words of description rather than of limitation.

Many modifications and variations of the present invention are possible in light of the above teachings. For example, securing means could comprise clamps or pins with fasteners. A different sort of weight may be used at the end of a retractable tape. The flanges on the spacer bracket may be of different lengths depending on whether the bracket will be used alone or in conjunction with other brackets or the flanges may be secured with bolts and the like. The slots in the bracket may be only a round opening. Therefore, within the scope of the appended claims, the present invention may be practiced otherwise than as specifically described.

What I claim is:

1. A convertible dipstick squeegee comprising:
   a) a base comprising a first section, a first foot peg, a second section, a second foot peg, and a midsection;
   b) a seat in said midsection with a first opening;
   c) a wiping member of dimension approximately equal to that of said seat and made of flexible resilient material;
   d) said wiping member further comprising a second opening and at least one cleaning slit;
   e) a securing member of approximately equal dimension to said seat said securing member comprising a third opening;
   f) means to removably secure said securing member over said wiping member in said seat;
   g) at least one spacer bracket comprising a top surface, a support, and means to detachably affix said bracket to a tank collar; and
   h) means to removably attach said base to said at least one spacer bracket.

2. The convertible dipstick squeegee claimed in claim 1 wherein said first and third openings are approximately equal in size, said second opening is smaller than said first and third openings, and all three opening are generally coaxial.

3. The convertible dipstick squeegee claimed in claim 1 wherein said means to detachably affix said spacer to said tank collar comprises an upper flange, a lower flange, and a space therebetween into which said collar fits.

4. The convertible dipstick squeegee claimed in claim 3 wherein said upper flange generally parallels said lower flange and both said upper and lower flanges angle from said support.

5. A convertible dipstick squeegee comprising a base comprising a first section, a first foot peg, a second section, a second foot peg, and a midsection; a seat in said midsection with a first opening; a wiping member of dimension approximately equal to that of said seat and made of flexible resilient material; said wiping member further comprising a second opening and at least one cleaning slit; a securing member of approximately equal dimension to said seat said securing member comprising a third opening; means to removably secure said securing member over said wiping member in said seat; at least one spacer bracket comprising a top surface, a support, and means to detachably affix said bracket to a tank collar; and means to removably attach said base to said at least one spacer bracket wherein said means to removably attach comprises a first slot in said first section of said base, an opening on the top surface of said spacer and a thumbscrew inserted through said slot and turned into said opening to secure said base to said at least one spacer.

6. The convertible dipstick squeegee claimed in claim 5 further comprising a second spacer bracket and said means to removably attach said base to said second spacer bracket.

7. The convertible dipstick squeegee claimed in claim 5 wherein said top surface of said spacer further comprises at least one ridge shaped complementarily to said slot and said means to removably attach said base further comprises inserting said ridge in said slot.

8. A convertible dipstick squeegee comprising:
   a) a base comprising a first section, a first foot peg, a second section, a second foot pet, and a midsection;
   b) a seat in said midsection with a first opening;
   c) a wiping member of dimension approximately equal to that of said seat and made of flexible resilient material;
   d) said wiping member further comprising a second opening and at least one cleaning slit;
   e) a securing member of approximately equal dimension to said seat said securing member further comprising a third opening;
   f) at least one spacer bracket comprising a top surface, a support, and means to detachably affix said bracket to a tank collar; and
   h) means to removably attach said base to said at least one spacer comprising a first slot in said first section of said base, an opening on the top surface of said spacer and a thumbscrew inserted through said slot and turned into said opening to secure said base to said at least one spacer.

9. The convertible dipstick squeegee claimed in claim 8 wherein said means to removably attach said base further comprises a ridge on said top surface of the spacer inserted into the first slot in the first section of the base.

10. The convertible dipstick squeegee claimed in claim 8 wherein said means to detachably affix said bracket to a tank collar comprises an upper flange extending generally perpendicular to said support.

11. The convertible dipstick squeegee claimed in claim 10 wherein said means to detachably affix said bracket further comprises a lower flange parallel to and separated by a space from said upper flange wherein said collar comprises a lip inserted in said space.

12. A convertible dipstick squeegee comprising:
   a) a base comprising a first section, a second section, and a midsection;
   b) a seat in said midsection with a first opening;
   c) a wiping member of dimension approximately equal to that of said seat and made of flexible resilient material;
   d) said wiping member further comprising a second opening and at least one cleaning slit;
   e) a securing member of approximately equal dimension to said seat said securing member comprising a third opening;
   f) means to removably secure said securing member over said wiping member in said seat;
   g) at least one spacer bracket comprising a top surface, a support, and means to detachably affix said bracket to a tank collar; and
   h) means to removably attach said base to said at least one spacer bracket comprising a protrusion from said bracket.

* * * * *